(12) United States Patent
Li et al.

(10) Patent No.: US 8,371,016 B2
(45) Date of Patent: Feb. 12, 2013

(54) ASSEMBLING METHOD OF AN INJECTION MOLD

(75) Inventors: Jian-ming Li, Tu Cheng (TW);
Xiao-ping Wu, Tu Cheng (TW);
Shih-hsiung Ho, Tu Cheng (TW)

(73) Assignee: Cheng Uei Precision Industry Co., Ltd., Tu Cheng, Taipei (TW)

( * ) Notice: Subject to any disclaimer, the term of this patent is extended or adjusted under 35 U.S.C. 154(b) by 281 days.

(21) Appl. No.: 12/899,537

(22) Filed: Oct. 6, 2010

(65) Prior Publication Data

US 2012/0084964 A1     Apr. 12, 2012

(51) Int. Cl.
*B29C 45/17* (2006.01)
*B29C 45/26* (2006.01)
*B29C 45/40* (2006.01)

(52) U.S. Cl. ............... 29/525.01; 425/182; 425/192 R; 425/444; 425/556

(58) Field of Classification Search ............... 29/525.01; 425/182, 192 R, 444, 556
See application file for complete search history.

(56) References Cited

U.S. PATENT DOCUMENTS

| | | | |
|---|---|---|---|
| 3,508,299 A * | 4/1970 | Ahern | 425/553 |
| 3,724,802 A * | 4/1973 | Veneria | 249/67 |
| 4,676,474 A * | 6/1987 | Vallet et al. | 249/68 |
| 5,556,656 A * | 9/1996 | Lampl et al. | 425/589 |
| 5,560,281 A * | 10/1996 | Schneid | 92/61 |
| 5,599,486 A * | 2/1997 | Fujishiro et al. | 264/40.1 |
| 5,620,718 A * | 4/1997 | Bohm | 425/190 |
| 5,855,824 A * | 1/1999 | Saito et al. | 264/2.2 |
| 5,916,603 A * | 6/1999 | Pleasant et al. | 425/182 |
| 6,248,281 B1 * | 6/2001 | Abe et al. | 264/328.7 |
| 6,929,464 B2 * | 8/2005 | Suzuki | 425/556 |
| 7,270,535 B2 * | 9/2007 | Inada et al. | 425/552 |
| 7,766,643 B2 * | 8/2010 | Zuffa | 425/441 |
| 8,029,267 B2 * | 10/2011 | Takao | 425/444 |

* cited by examiner

*Primary Examiner* — A. Dexter Tugbang
*Assistant Examiner* — Anthony Green
(74) *Attorney, Agent, or Firm* — Cheng-Ju Chiang

(57) ABSTRACT

An assembling method of an injection mold includes the steps of: disposing guide rods and a ejection pin plate on a punch template; inserting guide bushes into the ejection pin plate; inserting ejection pins respectively into the ejection pin plate and the punch template; fastening a ejection pin fixing plate to the ejection pin plate; fastening a die fixing plate and spacer plates to the punch template, and inserting the other ends of the guide rods into the die fixing plate; and disposing a press plate into the die fixing plate, and fastening the guide rods to the die fixing plate by tightening screws. The assembling method set the guide rods first o achieve a positioning function before ejection pin plate is assembled, and thereby capable of effectively eliminating the problems of deformation of the ejection pin plate, breaking of the ejection pin, and abrasion occurring in the return stroke.

4 Claims, 3 Drawing Sheets

ASSEMBLING METHOD OF AN INJECTION MOLD

TECHNICAL FIELD OF THE INVENTION

The present invention relates to an injection mold, and more particularly, to an assembling method of the injection mold.

BACKGROUND OF THE INVENTION

Referring to FIG. 3, a conventional injection mold 80 comprises a movable die 81 and a stationary die 82. The movable die 81 comprises a movable die fixing plate 811, a spacer plate 812, an ejection pin plate 813, an ejection pin fixing plate 814, a punch template 815, an ejection pin 816, and a guide rod 817. When the movable die 81 is assembled, it is general to insert the ejection pin 816 into ejection pin holes (not shown) of the ejection pin plate 813 and the punch template 815, and then fasten the ejection pin fixing plate 814 to the ejection pin plate 813 for preventing the ejection pin 816 from being ejected out. Then, the guide rod 817 is inserted into the punch template 815, the ejection pin fixing plate 814, the ejection pin plate 813, and the movable die fixing plate 811.

However, in the above-mentioned assembling method of the injection mold 80, the guide rod 817 can not achieve the positioning function before the ejection pin plate 813 and the ejection pin 816 are assembled. Moreover, the installation of the guide rod 817 is fulfilled by whacking to be inserted into the punch template 815, the ejection pin fixing plate 814, the ejection pin plate 813, and the movable die fixing plate 811. Consequently, in the assembling processes, the guide rod 817 may make the ejection pin plate 813 and the ejection pin fixing plate 814 deformed or wrapped due to elastic deformation. Further, this may cause the injection mold 80 uneven, and result in deforming the ejection pin plate 813 due to unequal forces, breaking the ejection pin 816, and the problem of abrasion in the return stroke. In addition, the guide rod 817 is disposed into the movable die fixing plate 811 and the punch template 815 generally in an interference fitting manner. The guide rod 817 may get loosened and thereby refracted due to the counterforce generated by repeated position motion of ejection and retraction during opening and closing the injection mold 80.

SUMMARY OF THE INVENTION

A main objective of the present invention is to provide an injection mold assembling method capable of setting ejection pins at a precise position for overcoming the drawbacks of the known techniques.

To achieve the above objective, the present invention provides an assembling method of an injection mold, wherein the injection mold comprises a movable die and a stationary die, and the movable die comprises a movable die fixing plate, two spacer plates, an ejection pin plate, an ejection pin fixing plate, a punch template, a plurality of ejection pins, a plurality of guide rods, a press plate, and a plurality of guide bushes, said the assembling method comprising steps of:

(1) disposing the guide rods and the ejection pin plate on the punch template;
(2) putting the guide bushes to encompass the guide rods and inserting the guide bushes into the ejection pin plate to be fastened therein;
(3) inserting the ejection pins respectively into the ejection pin plate and the punch template;
(4) fastening the ejection pin fixing plate to the ejection pin plate and inserting the guide bushes into the ejection pin fixing plate to be fastened therein;
(5) fastening the movable die fixing plate and the spacer plates to the punch template, and inserting the other ends of the guide rods into the movable die fixing plate to be fastened therein; and
(6) disposing the press plate into the movable die fixing plate, and fastening the guide rods to the movable die fixing plate by tightening screws.

As described above, the present invention adopts a process where the guide rod is set first to provide a positioning function before the ejection pin plate is assembled, so that deformation of the ejection pin plate, breaking of the ejection pin, and abrasion in the return stroke can all be avoided. In addition, since the screws are adopted to connect and fasten the bottom of the guide rod, the present invention eliminates the unreliability caused by loosening or retracting of the guide rod resulting from the counterforce generated by repeated position motion of ejection and retraction during the injection mold is employed to produce molded products.

DETAILED DESCRIPTION OF THE INVENTION

In order to illustrate the techniques, structural features, achieved objectives and effects of the present invention in details, an example is provided in conjunction with drawings and is described as follows.

Figure 1:
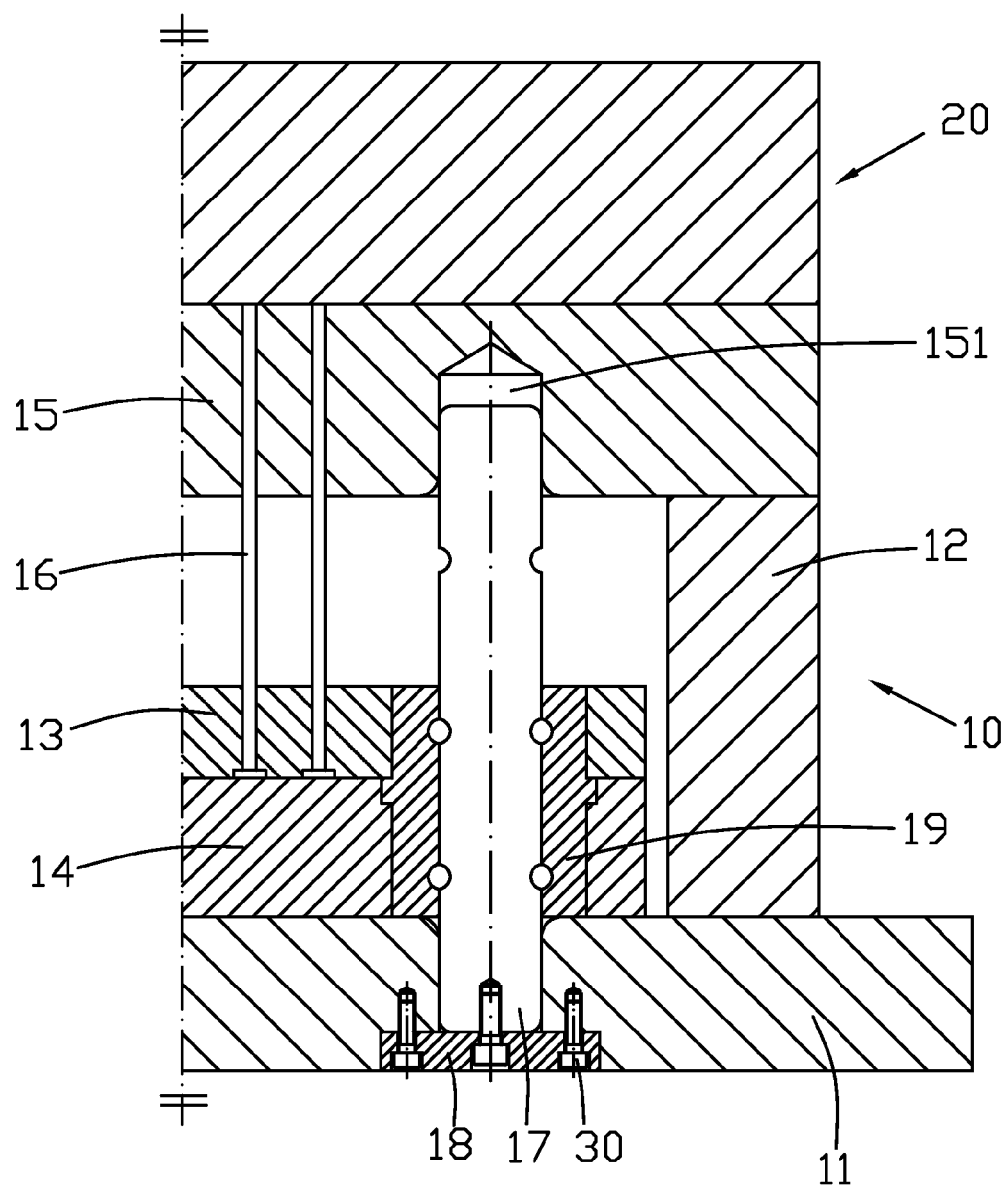
FIG. 1 is a partial cross-sectional view of an injection mold used in an injection mold assembling method according to the present invention in a mold closed condition.

Referring to FIG. 1, the present invention provide a method for assembling an injection mold, which is indicated at 1 in the drawings. The injection mold 1 comprises a movable die 10 and a stationary die 20.

Figure 2:
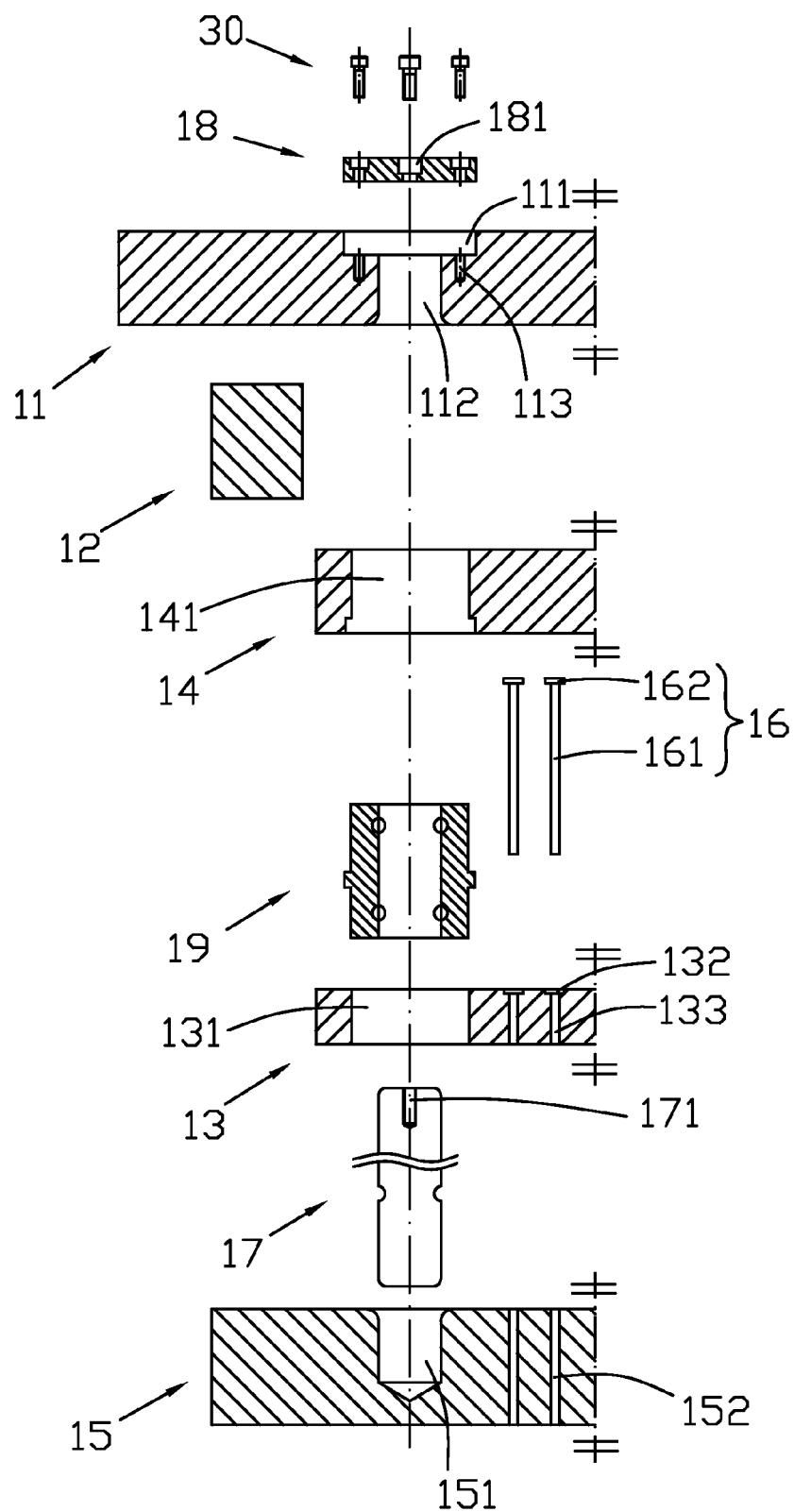
FIG. 2 is a schematic view illustrating the assembling method of the injection mold according to the present invention.
Figure 3:
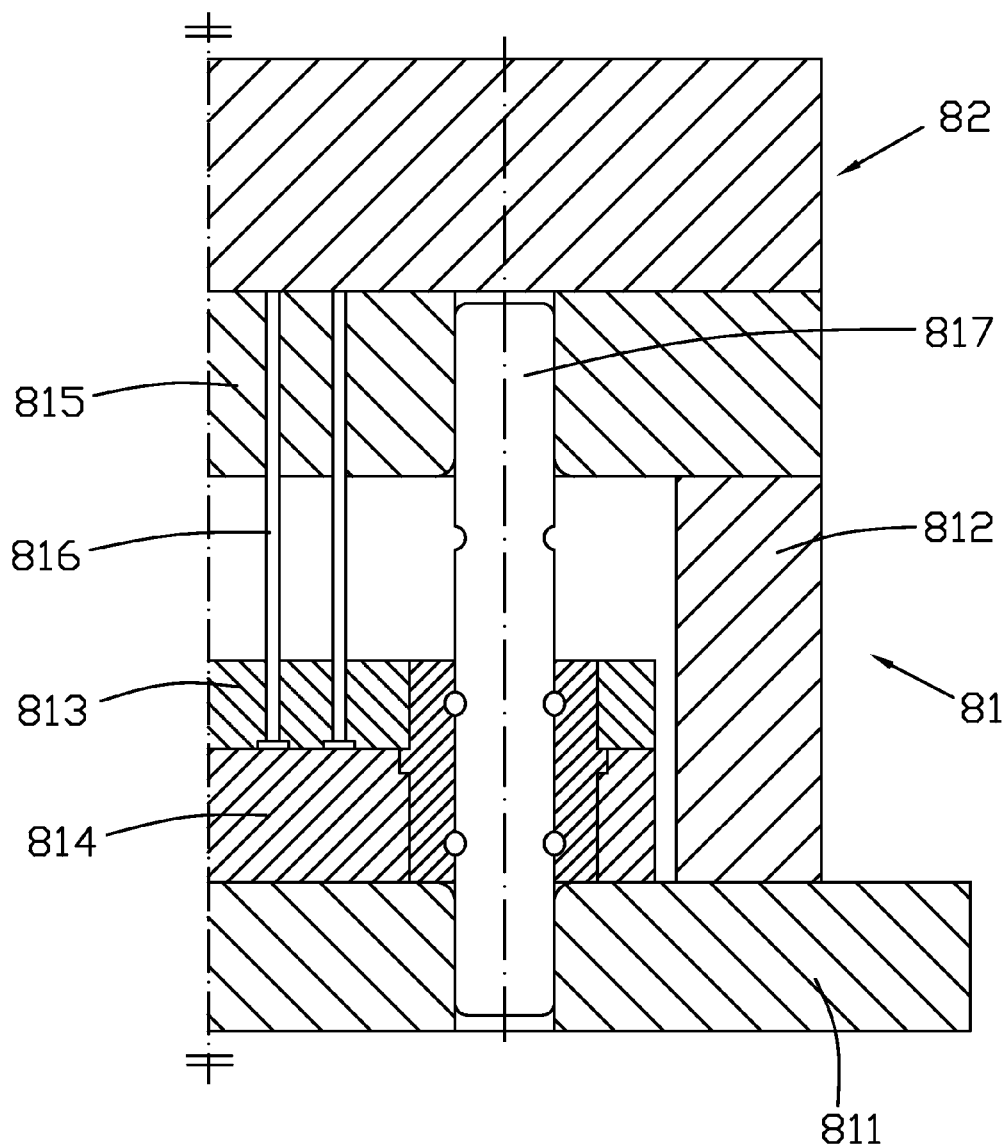
FIG. 3 is a partial cross-sectional view of a conventional injection mold in a mold closed condition.

Referring to FIGS. 1 and 2, the movable die 10 comprises a movable die fixing plate 11, two spacer plates 12, an ejection pin plate 13, an ejection pin fixing plate 14, a punch template 15, a plurality of ejection pins 16, a plurality of guide rods 17, a press plate 18, and a plurality of guide bushes 19. The movable die fixing plate 11 forms a concave trough 111. A middle portion of a bottom of the concave trough 111 forms a holding bore 112. The holding bore 112 penetrates the movable die fixing plate 11. On the bottom of the concave trough 111, screw holes 113 are respectively formed in two sides of the holding bore 112. The screw holes 113 are blind holes.

The ejection pin plate 13 forms a binding bore 131 penetrating the ejection pin plate 13. The ejection pin plate 13 also has a plurality of holding troughs 132 formed in a left side of the binding bore 131. Bottom walls of the holding troughs 132 form ejection pin holes 133 respectively. The ejection pin holes 133 penetrate the ejection pin plate 13. The ejection pin fixing plate 14 forms a T-shaped guide bush fixing bore 141 penetrating the ejection pin fixing plate 14. The punch template 15 forms a guide rod fixing bore 151. The guide rod fixing bore 15 is a blind hole. The punch template 15 forms a plurality of ejection pin holes 152 in a left side of the guide rod fixing bore 151. The ejection pin holes 152 penetrate the punch template 15. When the movable die 10 is assembled, the ejection pin holes 133 and the ejection pin holes 152 are respectively set in lines with respect to each other. The ejection pins 16 respectively have a base 161 and a holding portion 162. A bottom of one end of each guide rod 17 has a threaded hole 171. The press plate 18 forms a plurality of through holes 181 penetrating the press plate 18.

The assembling method of the injection mold 1 comprises steps of:

(1) inserting one end of the guide rod 17 into the guide rod fixing bore 151 of the punch template 15 to be fastened therein;

(2) disposing the ejection pin plate 13 on the punch template 15;

(3) putting the guide bush 19 to encompass the guide rod 17 and inserting the guide bush 19 into the binding bore 131 of the ejection pin plate 13 to be fastened therein;

(4) inserting the bases 161 of the ejection pins 16 respectively into the ejection pin holes 133 of the ejection pin plate 13 and the ejection pin holes 152 of the punch template 15, and fixing the holding portion 162 to the holding troughs 132;

(5) fastening the ejection pin fixing plate 14 to the ejection pin plate 13 for preventing the ejection pins 16 from being ejected out, and inserting the guide bush 19 into the guide bush fixing bore 141 of the ejection pin fixing plate 14 to be fastened therein;

(6) fastening the movable die fixing plate 11 and the spacer plates 12 to the punch template 15, and inserting the other end of the guide rod 17 into the holding bore 112 of the movable die fixing plate 11 to be fastened therein;

(7) disposing the press plate 18 into the concave trough 111 of the movable die fixing plate 11, and disposing screws 30 respectively into the through holes 181, the screw holes 113, and the threaded hole 171 so as to fasten the guide rod 17 to the movable die fixing plate 11 by tightening the screws 30.

In the aforementioned assembling processes, since the guide rod 17 is set on the punch template 15 in advance, the ejection pin plate 13 and the ejection pins are able to be precisely located. This can better ensure the levelness while assembling the injection mold 1, and thereby preventing the ejection pin plate 13 from being deformed, protecting the ejection pins from breaking, and eliminating the problem of abrasion in return strokes. In addition, since the screws 30 are used to connect and fasten the bottom of the guide rod 17, the present invention eliminates the unreliability caused by loosening or retracting of the guide rod 17 resulting from the counterforce generated by repeated position motion of ejection and retraction during the injection mold 1 is employed to produce molded products.

As described above, the present invention adopts a process where the guide rod 17 is set first to provide a positioning function before the ejection pin plate 13 is assembled, so that deformation of ejection pin plate 13, breaking of the ejection pin 16, and abrasion in the return stroke can all be avoided.

Although the present invention has been described with reference to the preferred embodiment thereof, it is apparent to those skilled in the art that a variety of modifications and changes, such as disposing the ejection pin plate on the punch template and then inserting the guide rod into the guide rod fixing bore of the punch template, may be made without departing from the scope of the present invention, which is intended to be defined by the appended claims.

What is claimed is:

1. An assembling method of an injection mold, the injection mold comprising a movable die and a stationary die, the movable die comprising a movable die fixing plate, a plurality of spacer plates, an ejection pin plate, an ejection pin fixing plate, a punch template, a plurality of ejection pins, a plurality of guide rods, a press plate, and a plurality of guide bushes, the assembling method comprising steps of:

(1) disposing the guide rods and the ejection pin plate on the punch template;

(2) putting the guide bushes to encompass the guide rods and inserting the guide bushes into the ejection pin plate to be fastened therein;

(3) inserting the ejection pins respectively into the ejection pin plate and the punch template;

(4) fastening the ejection pin fixing plate to the ejection pin plate and inserting the guide bushes into the ejection pin fixing plate to be fastened therein;

(5) fastening the movable die fixing plate and the spacer plates to the punch template, and inserting the other ends of the guide rods into the movable die fixing plate to be fastened therein; and (6) disposing the press plate into the movable die fixing plate, and fastening the guide rods to the movable die fixing plate by tightening screws;

wherein the movable die fixing plate forms a concave trough, a middle portion of a bottom of the concave trough forming a holding bore extending through the movable die fixing plate, screw holes being formed in two sides of the holding bore on the bottom of the concave trough, the screw holes being blind holes, one end of each of the guide rods forming a threaded hole, the press plate forming a plurality of through holes penetrating the press plate, and wherein the guide rods are inserted into the holding bores to be fastened therein, the press plate being disposed into the concave trough, and screws being respectively inserted into the through holes, the screw holes, and the thread holes.

2. The assembling method according to claim 1, wherein the ejection pin plate is disposed to cover the punch template after inserting the guide rods into the punch template.

3. The assembling method according to claim 1, wherein the ejection pin plate is disposed to cover the punch template before inserting the guide rods into the punch template.

4. The assembling method according to claim 1, wherein the punch template forms a guide rod fixing bore which is a blind hole.

* * * * *